United States Patent
Ikefuji et al.

(10) Patent No.: US 6,624,743 B1
(45) Date of Patent: Sep. 23, 2003

(54) AUTOMATIC ADJUSTING RESPONDER WITH NO SELF-CONTAINED POWER SUPPLY

(75) Inventors: Yoshihiro Ikefuji, Kyoto (JP); Shigemi Chimura, Kyoto (JP); Satoshi Yoshioka, Kyoto (JP)

(73) Assignee: Rohm Co., LTD, Kyoto (JP)

( * ) Notice: Subject to any disclaimer, the term of this patent is extended or adjusted under 35 U.S.C. 154(b) by 0 days.

(21) Appl. No.: 09/319,253
(22) PCT Filed: Dec. 8, 1997
(86) PCT No.: PCT/JP97/04505
   § 371 (c)(1),
   (2), (4) Date: Jun. 9, 1999
(87) PCT Pub. No.: WO98/29828
   PCT Pub. Date: Jul. 9, 1998

(30) Foreign Application Priority Data

Dec. 27, 1996 (JP) ............................................. 8-349700

(51) Int. Cl.[7] .................................................. H04Q 1/00
(52) U.S. Cl. ................ 340/10.4; 455/161.3; 455/195.1; 340/10.1
(58) Field of Search ............................ 455/195.1, 161.3; 340/10, 525.49, 525.72, 342, 344, 928; 235/492

(56) References Cited

U.S. PATENT DOCUMENTS

| 5,446,447 A | * | 8/1995 | Carney et al. ............ 340/572.4 |
| 5,621,396 A | * | 4/1997 | Flaxl ......................... 340/10.4 |
| 5,621,767 A | * | 4/1997 | Brandt et al. ............. 455/161.3 |
| 5,652,423 A |   | 7/1997 | Saitoh et al. ................ 235/492 |
| 5,698,838 A | * | 12/1997 | Yamaguchi .................. 235/492 |
| 5,892,300 A |   | 4/1999 | Rydval |
| 5,953,642 A |   | 9/1999 | Feldtkeller et al. |

FOREIGN PATENT DOCUMENTS

| DE | 4438287 C1 | 5/1996 |
| JP | 57-2145 | 1/1982 |
| JP | 8-167012 | 6/1996 |
| KR | 1996-2076 | 1/1996 |
| WO | 93/23908 | 11/1993 |
| WO | WO 96/13804 | 5/1996 |
| WO | WO98/29828 | 7/1998 |

OTHER PUBLICATIONS

WO 96/13804, May 9, 1996, Peter Rudval, (abstract only).
DE 4438287, May 9, 1996, Martin Feldtkeller et al. (abstract only).

* cited by examiner

Primary Examiner—B Zimmerman
(74) Attorney, Agent, or Firm—Arent Fox Kintner Plotkin & Kahn, PLLC (57) ABSTRACT

In a non-contact IC card, a driving portion 5 sequentially switches a resonance frequency of a resonance circuit 1. A reference voltage generating portion 6 receives an output voltage of resonance circuit 1 for outputting a prescribed reference voltage. An output value measuring portion 7 measures a magnitude of the output voltage of resonance circuit 1 at each resonance frequency using the reference voltage as a reference. An output value storing portion 8 stores a measurement value (an output value). A manner determining portion 9 selects the largest one of the output values stored in output value storing portion 8, and determines a switching manner corresponding thereto as a suitable switching manner. Thus, the suitable switching manner allowing the most efficient power supply can be achieved.

12 Claims, 12 Drawing Sheets

| j | $\phi C$ | $\phi B$ | $\phi A$ | SUITABLE FLAG |
|---|---|---|---|---|
| 1 | 0 | 0 | 0 | 0 |
| 2 | 1 | 0 | 0 | 0 |
| 3 | 1 | 1 | 0 | 0 |
| 4 | 1 | 1 | 1 | 0 |
| 5 | 1 | 1 | 1 | 1 |
| 6 | 1 | 1 | 1 | 0 |
| 7 | 1 | 1 | 0 | 0 |
| ... | ... | ... | ... | ... |
| n | 0 | 0 | 0 | 0 |

AUTOMATIC ADJUSTING RESPONDER WITH NO SELF-CONTAINED POWER SUPPLY

FIELD OF THE INVENTION

The present invention relates to a responder, integrated circuit chip, non-contact IC card and device with no self-contained power supply in a non-contact IC card communication system, and a method of automatically adjusting the device with no self-contained power supply. More particularly, the present invention relates to adjustment of a resonance frequency in a device which performs an operation such as communication in an electrically non-contact state with another device by utilizing an electromagnetic wave.

DESCRIPTION OF THE BACKGROUND ART

Conventionally, a contact type IC card has been used for externally inputting/outputting data through an electrode of an IC (Integrated Circuit) embedded in a card. However, such contact type IC card must be inserted to a reading/writing device for input/output of data and is difficult to handle. Then, a non-contact IC card came into existence which performs electric power supply and data exchange using an electromagnetic wave. Such non-contact IC card is used, for example, for a gate at a station and a gate for a ski lift.

Figure 19:
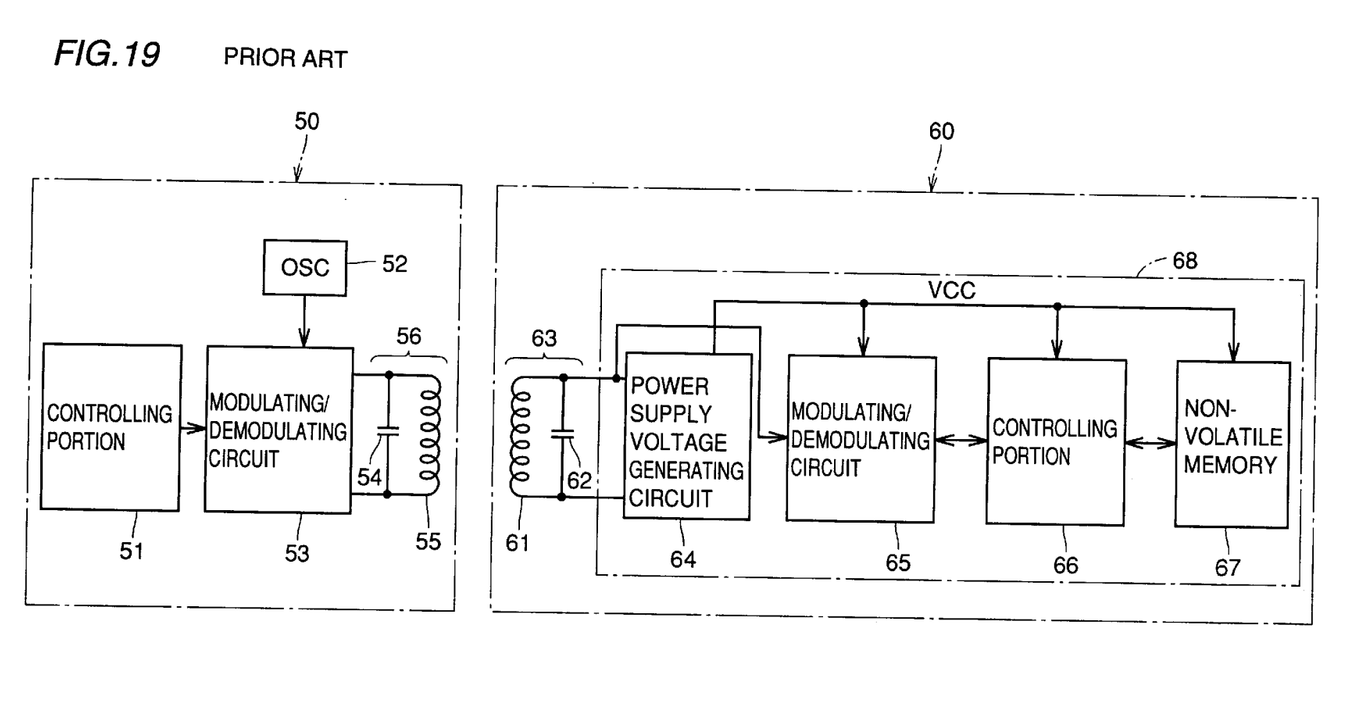
FIG. 19 is a block diagram showing a structure of a conventional non-contact IC card communication system.

FIG. 19 is a circuit block diagram showing a structure of a communication system using such non-contact IC card. Referring to FIG. 19, the system includes an interrogator 50 (which is mounted for example in a gate for a ski lift), and a non-contact IC card 60. Interrogator 50 transmits a high-frequency carrier from an oscillating circuit (OSC) 52 via an antenna 55 under control of a controlling portion 51. When non-contact IC card 60 comes close to interrogator 50, the high-frequency carrier is received by an antenna (a coil) 61 of non-contact IC card 60. A power supply voltage generating circuit 64 converts the received high-frequency carrier to a direct current power for supply for the other circuit portion. Thus, non-contact IC card 60 can operate when it comes close to interrogator 50. It is noted that power supply voltage generating circuit 64, a modulating/demodulating circuit 65, controlling portion 66 and non-volatile memory 67 are included in an IC chip 68 so that a small size is achieved.

Information is transmitted from interrogator 50 to non-contact IC card 60 by modulation of the high-frequency carrier by modulating/demodulating circuit 53 under control of controlling portion 51. Non-contact IC card 60 demodulates the modulated high-frequency carrier by modulating/demodulating circuit 65. Controlling portion 66 receives the demodulated information for performing a necessary process such as rewriting of a content in non-volatile memory 67 and transmission of information.

Conversely, information is also transmitted from non-contact IC card 60 to interrogator 50. Here, an oscillating circuit is not provided on the side of non-contact IC card 60. Thus, the high-frequency carrier which has not been modulated is transmitted form the side of interrogator 50, and an impedance of a resonance circuit 63 including antenna 61 and a condenser 62 is changed by modulating/demodulating circuit 65 on the side of non-contact IC card 60. Interrogator 50 detects and demodulates the change in impedance as that of resonance circuit 56 on its own side including antenna 55 and condenser 54. Controlling portion 51 receives the demodulated information for performing a necessary process.

When non-contact IC card 60 is moved away from interrogator 50, the operation of card 60 stops because power is not supplied anymore. However, the stored information is retained even when power is removed as non-volatile memory 67 is used.

Thus, the communication system using non-contact IC card 60 is operated.

In the above described conventional technology, however, variation in authorized parts or the like makes the resonance frequency of resonance circuit 63 on the side of IC card 60 deviate from a design value, whereby IC card is not supplied with sufficient power. As a result, communication between IC card 60 and interrogator 50 is allowed only over a short distance, or in the extreme case, the operation thereof may not be allowed.

DISCLOSURE OF THE INVENTION

An object of the present invention is to provide a device which receives power supply from and communicates with the other device in a non-contact state and which is provided with a structure capable of suitably adjusting a resonance frequency of a resonance circuit.

Briefly speaking, a responder in a non-contact IC card communication system according to the present invention detects an output level of a resonance circuit by sequentially switching the resonance frequency of the resonance circuit by a switch circuit, and sets a switching manner of the switch circuit such that a desired output level is attained. Therefore, even when the resonance frequency is deviated from a suitable value due to initial variation in characteristic values of an antenna or condenser of the resonance circuit, the resonance frequency can automatically be adjusted to the suitable value for communication.

Preferably, a switching manner storing portion is provided which stores a preferred switching manner of the switch circuit. In this case, once the switching manner is stored, the resonance frequency needs not be sequentially switched for adjustment. Thus, an operation at the preferred resonance frequency can be rapidly performed.

More preferably, a reference voltage generating circuit is provided which receives an output voltage of the resonance circuit for generating a prescribed reference voltage. A magnitude of the output voltage of the resonance circuit in each switching manner is measured in accordance with the reference voltage. Thus, the output voltage of the resonance circuit is readily and correctly measured, thereby enabling correct adjustment of the resonance frequency.

More preferably, an output value storing portion is provided which stores an output value (measurement value) from the resonance circuit in each switching manner corresponding to the switching manner and, based on the stored content, a suitable switching manner is determined. Thus, the suitable switching manner is more readily and correctly determined.

More preferably, the switching manner which corresponds to the greatest output value is determined as the suitable switching manner. Thus, the resonance frequency can be adjusted such that the efficiency of the resonance circuit attains to the highest level.

More preferably, the output value is obtained every time the switching manner is switched and, when the output value exceeds a prescribed threshold value, the switching manner at the time is set as the suitable switching manner. Thus, automatic adjustment of the resonance frequency is rapidly performed.

More preferably, the switch circuit includes a plurality of transistors. Thus, the switching manner can readily and electrically be controlled for storage.

More preferably, the responder receives operation power from the resonance circuit. Thus, efficient power supply is ensured.

More preferably, communication of information is performed by the resonance circuit. Thus, efficient communication state is ensured.

More preferably, the suitable switching manner is determined during manufacture of the responder. Thus, even when the resonance frequency deviates from the design value due to variation in authorized parts or the like, a responder having a resonance circuit at a desired resonance frequency is readily manufactured.

More preferably, the suitable switching manner is determined once in a prescribed period of time. Thus, even when the resonance frequency changes due to secular change or change in ambient temperature, it is automatically adjusted to be back at a desired resonance frequency.

Further, briefly speaking, an integrated circuit chip used in a device with no self-contained power supply of the present invention detects an output level of a resonance circuit by sequentially switching a resonance frequency of the resonance circuit by a switch circuit, and determines and stores a switching manner of the switch circuit such that a desired output level is achieved. Thus, the resonance frequency is automatically adjusted to a suitable value, thereby enabling efficient power supply.

Further, briefly speaking, a non-contact IC card according to the present invention detects an output level of a resonance circuit by sequentially switching a resonance frequency of the resonance circuit by a switch circuit, and determines and stores a switching manner of the switch circuit such that a desired output level is achieved. Thus, the switching manner allowing a suitable resonance frequency can automatically be obtained for storage. In addition, once the switching manner is stored, it is not necessary to switch and adjust the resonance frequency any more, whereby an operation with at a preferred resonance frequency is rapidly performed. Further, a reference voltage generating circuit is provided which generates a prescribed reference voltage regardless of variation in output voltages of the resonance circuit, so that the output level of the resonance circuit in each switching manner is measured based on the reference voltage. Thus, the resonance frequency is readily and correctly adjusted in the non-contact IC card not having a power supply.

Briefly speaking, in a method of automatically adjusting a device with no self-contained power supply according to the present invention, an output level of a resonance circuit is detected while switching a resonance frequency of the resonance circuit by a switch signal, and the switch signal is applied to the resonance circuit such that the highest output level is achieved. Thus, the resonance frequency is automatically adjusted to a suitable value for efficient power supply.

BEST MODE FOR CARRYING OUT THE INVENTION

Figure 1:
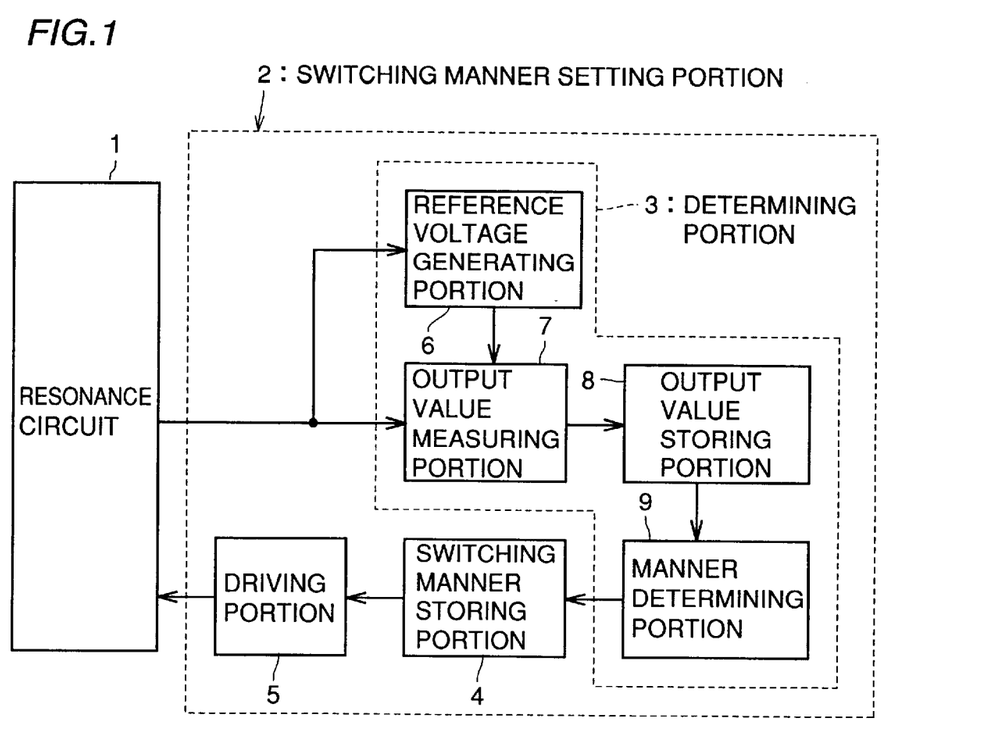
FIG. 1 is a block diagram showing a basic structure of a non-contact IC card according to the present invention.

Before the description of the embodiments, a principle of the present invention will be given. FIG. 1 is a block diagram showing a basic structure of a non-contact IC card which can operate by receiving power from an interrogator. A resonance frequency of a resonance circuit 1 can be switched when a switch circuit in resonance circuit 1 is switched by a driving portion 5. Driving portion 5 sequentially switches the resonance frequency of resonance circuit 1. A reference voltage generating portion 6 receives an output voltage of resonance circuit 1 for converting it to a direct current voltage. It is noted that, although a magnitude of the converted direct current voltage changes by switching the resonance frequency, reference voltage, generating portion 6 generates a prescribed reference voltage regardless of the change.

An output value measuring portion 7 measures an output value of resonance circuit 1 at each resonance frequency using the reference voltage as a reference. The measured output value is stored in an output value storing portion 8 corresponding to each resonance frequency (that is, each switching manner).

A manner determining portion 9 selects the largest one of output values stored in output value storing portion 8, and determines a corresponding switching manner as a preferred switching manner (a suitable switching manner). Thus, the suitable switching manner for the resonance frequency which allows the most efficient power supply is obtained. The suitable switching manner is stored in a switching manner storing portion 4.

Thus, after the resonance frequency is adjusted, driving portion 5 drives the switch circuit in resonance circuit 1 in accordance with the suitable switching manner stored in switching manner storing portion 4, and determines the resonance frequency of resonance circuit 1. In other words, the resonance frequency needs not be adjusted every time when the non-contact IC card is operated. It is noted that switching manner storing portion 4 can hold a content even when power is not supplied.

A non-contact IC card according to the present invention will now be described in detail with reference to the drawings.

First Embodiment

Figure 2:
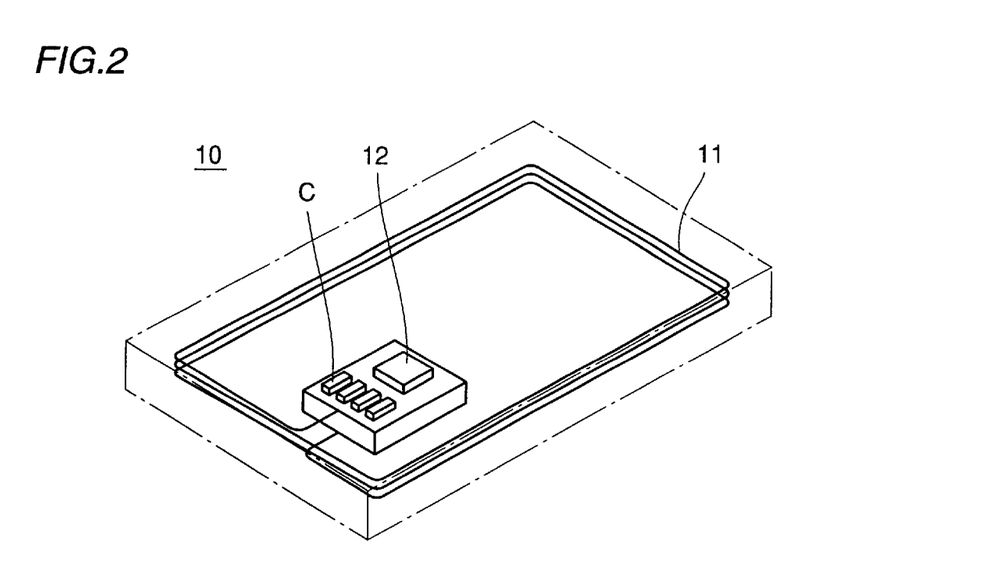
FIG. 2 is an illustration showing an internal structure of a non-contact IC card according to a first embodiment of the present invention.

FIG. 2 is an illustration showing an internal structure of a non-contact IC card according to a first embodiment of the present invention. Referring to FIG. 2, a non-contact IC card 10 includes an antenna 11, a plurality of condensers C and an IC chip 12 in a card like base material, which is shown with a chain-dotted line.

Figure 3:
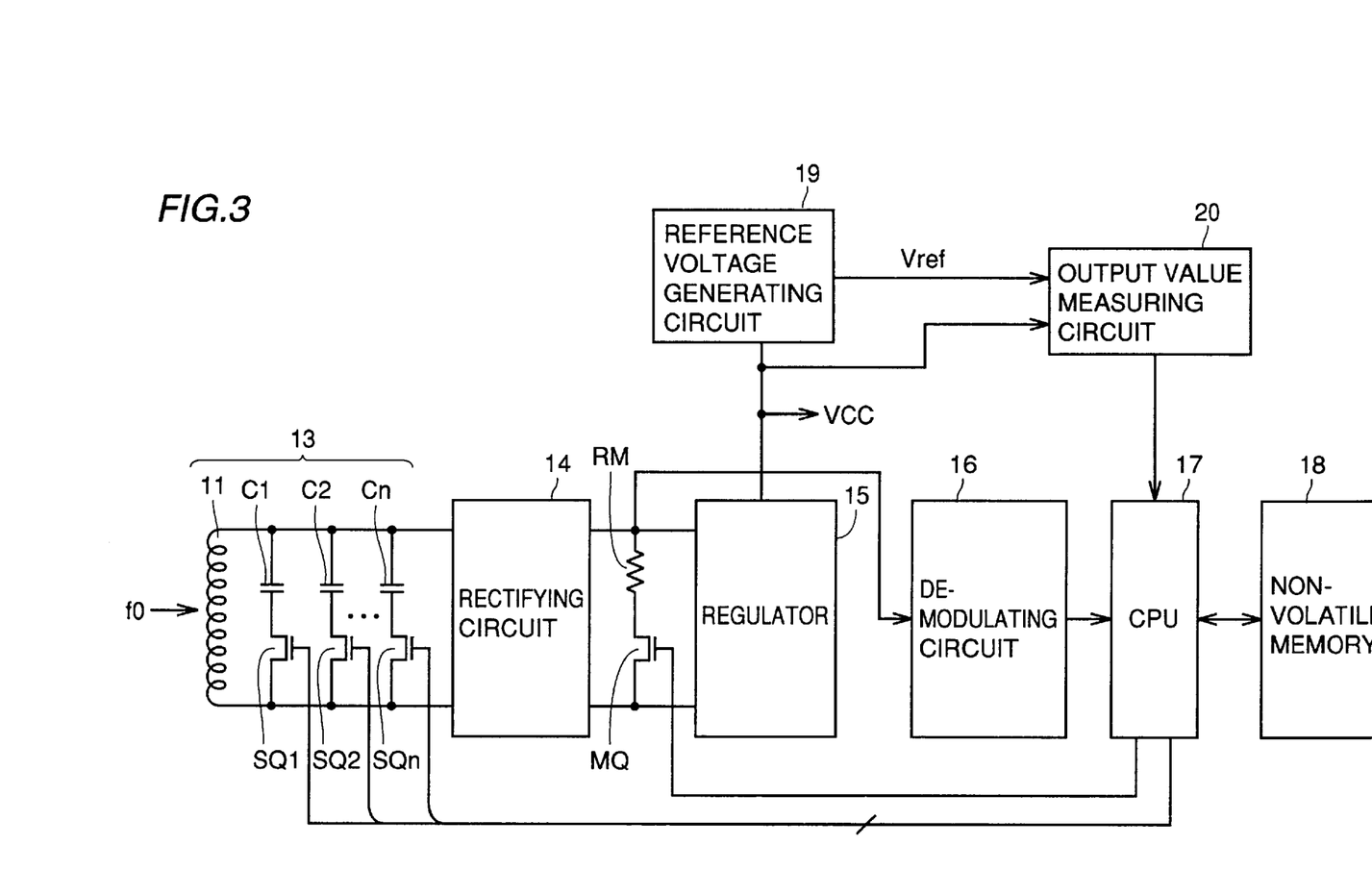
FIG. 3 is a circuit block diagram showing a structure of the non-contact IC card shown in FIG. 2.

FIG. 3 is a circuit block diagram showing a structure of non-contact IC card 10. Parts of the structure of IC card 10 excluding antenna 11 and condensers C1, C2, ..., Cn are structured as an IC chip 12. A rectifying circuit 14 rectifies a received high-frequency carrier for applying it to a regulator 15. Regulator 15 stabilizes and supplies it for each portion as a power supply voltage VCC. A demodulating circuit 16 detects and demodulates the modulated high-frequency carrier for reproduction of data. The data is applied to CPU 17 for a prescribed process.

Data is transmitted to an interrogator 50 by turning on/off a transistor for modulation MQ by CPU 17 for connecting/disconnecting a resistance element RM and a rectifying circuit 14 when interrogator 50 is outputting an unmodulated high-frequency carrier. Thus, an amplitude of the carrier is changed by changing an impedance for the side of interrogator 50, so that data is restored in interrogator 50. It is noted that an operation program of CPU 17 is stored in a non-volatile memory 18.

In IC card 10, a resonance circuit 13 includes antenna 11, condensers C1, C2, ..., Cn and transistors SQ1, SQ2, ..., SQn which are switching means. A capacitance of condenser Cn/2 is designed such that a resonance frequency fn/2 of resonance circuit 13 formed of condenser Cn/2 and antenna 11 matches a frequency of a high-frequency carrier transmitted from interrogator 50. The capacitances of the other condensers are set such that the resonance frequencies thereof are slightly different starting from resonance frequency fn/2. IC card 10 is structured such that resonance frequency f1 when condenser C1 is connected is the lowest, resonance frequency fn when condenser Cn is connected is the highest, and differences between resonance frequencies of two adjacent condensers are equal.

Figure 4:
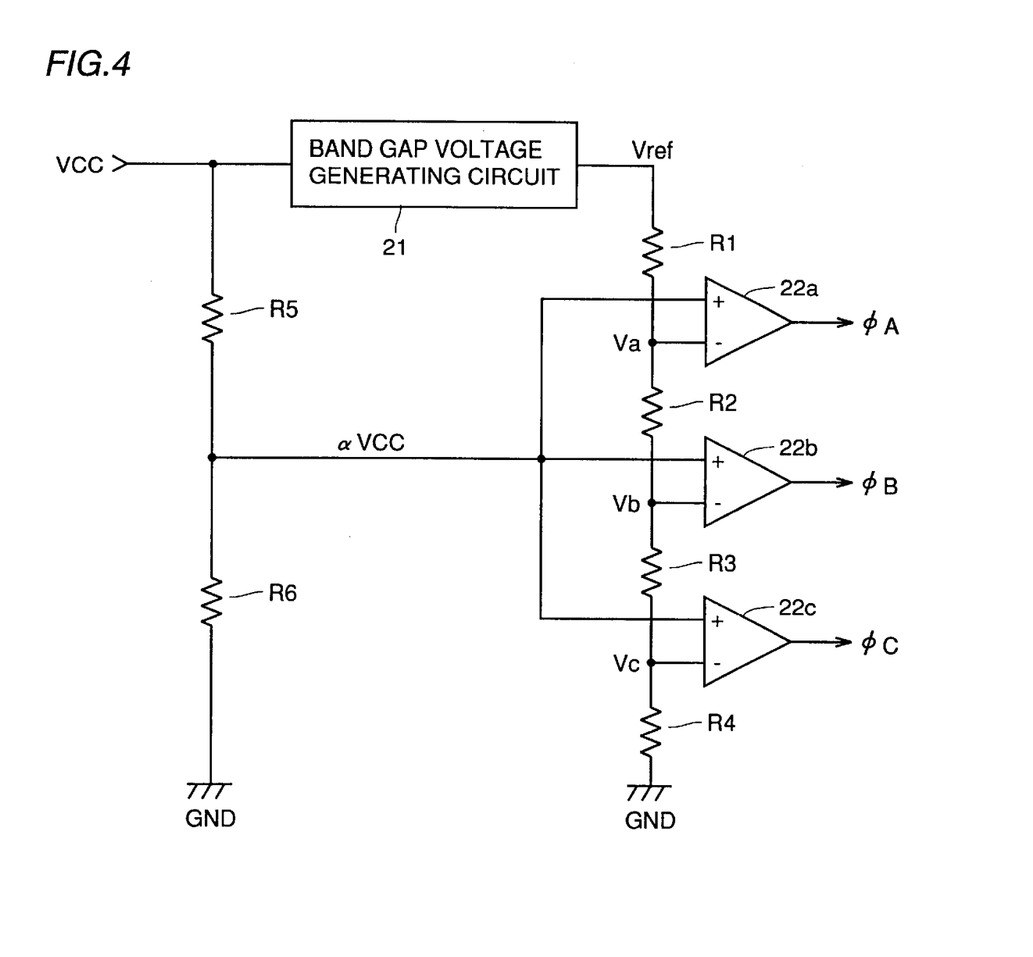
FIG. 4 is a circuit block diagram showing a structure of a reference voltage generating circuit and an output value measuring circuit shown in FIG. 3.

An output from regulator 15 is applied to a reference voltage generating circuit 19 which is a reference voltage generating means and an output value measuring circuit 20 which is an output value measuring means. Reference voltage generating circuit 19 and output value measuring circuit 20 are shown in FIG. 4 in greater detail. In IC card 10, a band gap voltage generating circuit 21 is used as reference voltage generating circuit 19. Band gap voltage generating circuit 21 maintains its output voltage at a prescribed level even when power supply voltage VCC applied from regulator 15 changes. Thus, the output voltage is used as a reference voltage Vref.

Reference voltage Vref is divided by resistance elements R1 to R4 for obtaining threshold voltages Va, Vb and Vc, and an output voltage of regulator 15 is divided by resistance elements R5 and R6. When threshold voltages Va, Vb and Vc and a voltage value αVCC (where α=R6/(R5+R6)) obtained by the division by resistance elements R5 and R6 are compared by comparators 22a, 22b and 22c, output levels φA, φB and φC are obtained. In other words, when a receiving strength of the carrier is large and αVCC is greater than Va, all outputs φA, φB and φC from comparators 22a, 22b and 22c attain to "H" or "1". When αVCC is smaller than Va and greater than Vb, output φA from comparator 22a attains to an "L" or "0" level, and outputs φB and φC from comparators 22b and 22c attain to an "H" or "1" level. Similarly, when αVCC is smaller than Vb and greater than Vc, outputs φA and φB from comparators 22a and 22b attain to "0", and only φC from comparator 22c attains to "1". When αVCC is smaller than Vc, all of outputs φA, φB and φC from comparators 22a, 22b and 22c attain to "0". Outputs φA, φB and φC from comparators 22a, 22b and 22c are applied to CPU 17.

Figure 5:
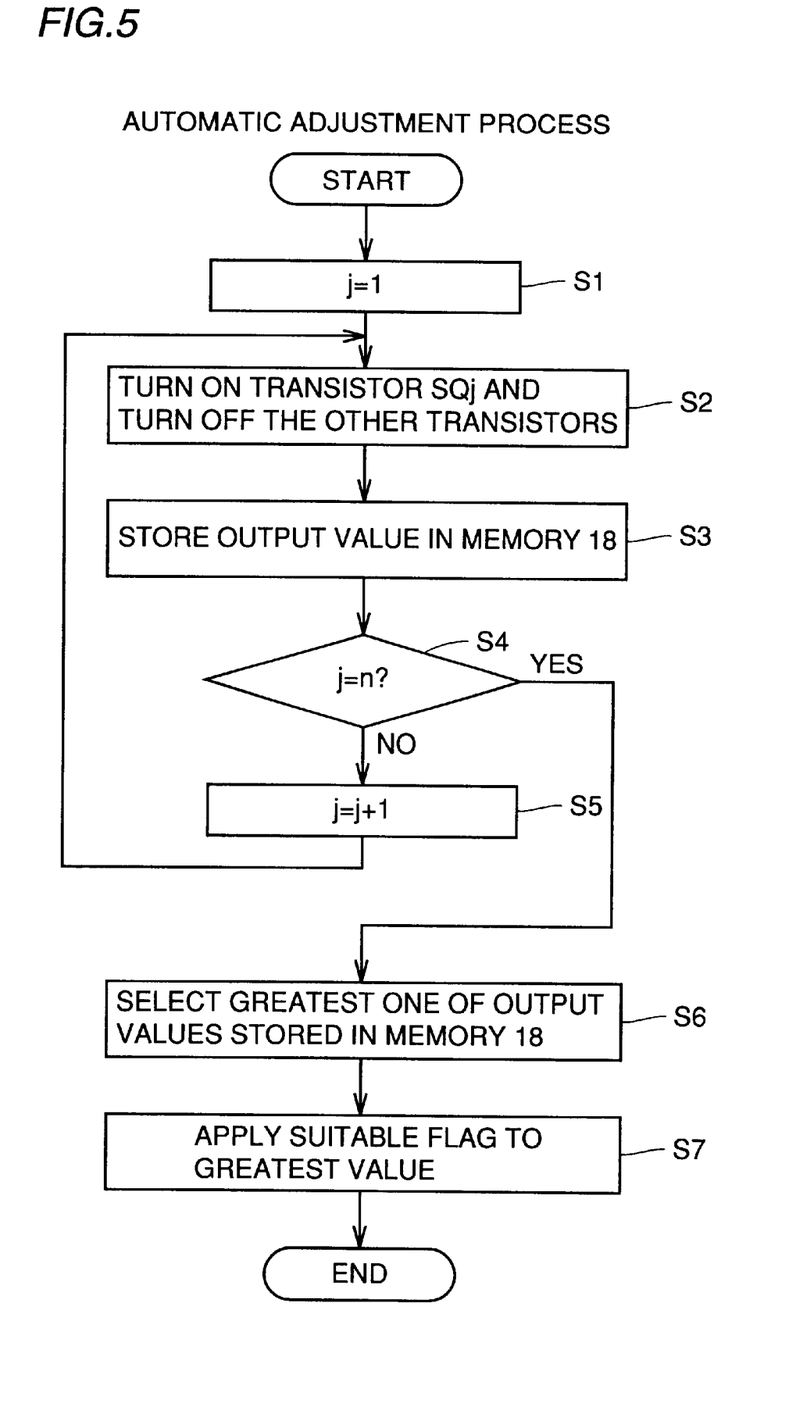
FIG. 5 is a flow chart showing a process of automatically adjusting the non-contact IC card shown in FIGS. 2 to 4.

Returning to FIG. 3, a program for automatically adjusting a resonance frequency is also stored in non-volatile memory 18 in addition to a program for communication. A flow chart of the program for automatic adjustment is shown in FIG. 5. A process of automatically adjusting the resonance frequency will now be described with reference to the flow chart in FIG. 5 and the circuit block diagram in FIG. 3.

Figure 6:
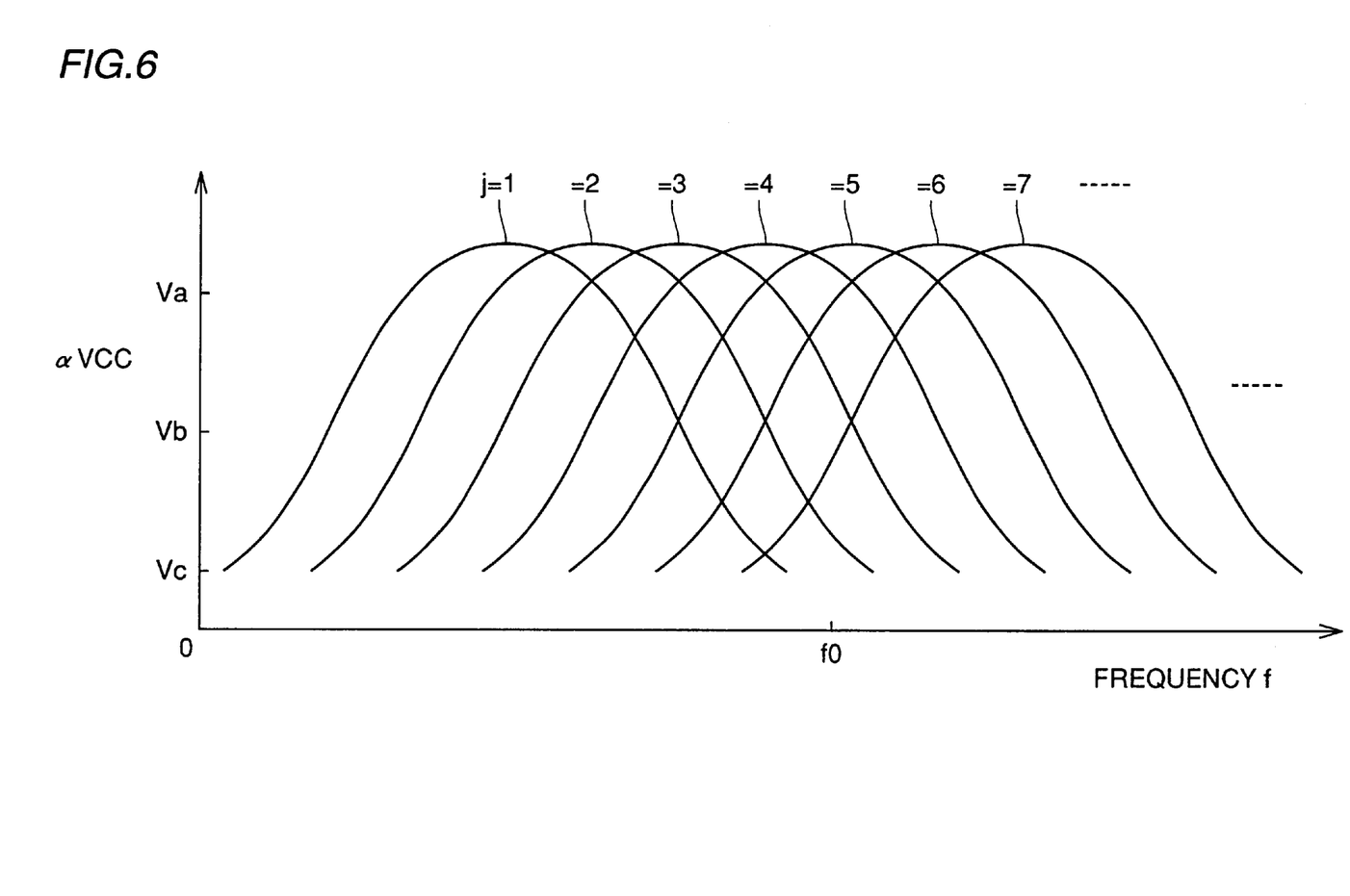
FIG. 6 is a diagram showing a relation between a frequency characteristic of the resonance circuit and a carrier frequency of an interrogator for each switching manner.
Figure 7:
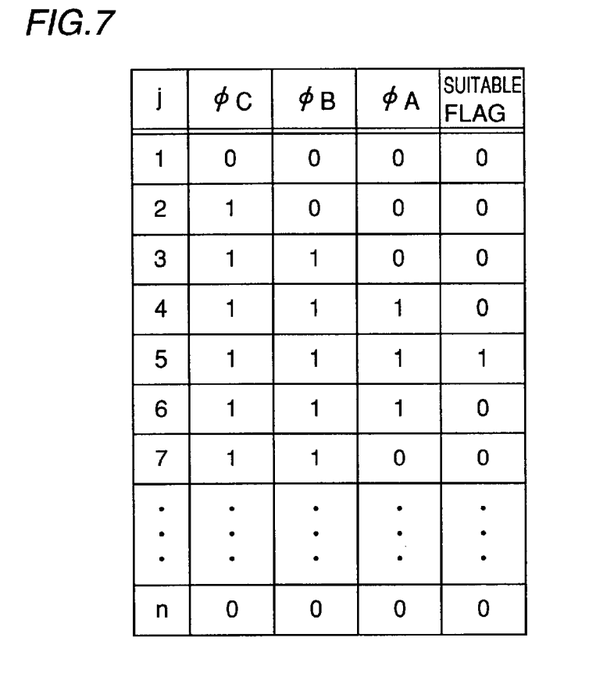
FIG. 7 is a table showing contents stored in a non-volatile memory in the automatic adjustment process.

Upon entering a mode of automatic adjustment, CPU 17 first sets a variable j indicating a switching manner at 1 (a step S1). It controllably turns on transistor SQj and turns off the other transistors (a step S2). Only transistor SQ1 is turned on, as now j=1. Thus, condenser C1 is connected, so that the lowest resonance frequency is achieved. A frequency characteristic of the resonance circuit in this case is shown with a curve for j=1 in FIG. 6. It is noted that an axis of ordinate in FIG. 7 represents αVCC. If the frequency of the high-frequency carrier from interrogator 50 is f0, none of outputs φA to φC from comparators 22a to 22c attains to "1". CPU 17 stores outputs φA to φC from comparators 22a to 22c in non-volatile memory 18 such that they corresponds to switching manner j (a step S3) as shown in FIG. 7. Here, φA=0, φB=0 and φC=0 are stored. It is noted that a portion of non-volatile memory 18 shown in FIG. 7 corresponds to an output value storing means and a switching manner storing means.

Then, in a step S4, it is determined if switching manner j has attained to a maximum value n. If not, switching manner j is incremented, so that j=2 (a step S5). Thereafter, the process returns to step S2, and a process similar to that described above is performed for the second switching manner. More specifically, transistor SQ2 is turned on and the other transistors are turned off, so that condenser C2 is connected to antenna 11. Thus, the frequency characteristics of the resonance circuit is as shown with a curve for j=2 in FIG. 6. Accordingly, only output φC from comparator 22c attains to "1" for the high-frequency carrier of f0. CPU 17 receives outputs φA to φC and stores φA=0, φB=0 and φC=0 in non-volatile memory 18 such that they correspond to j=2, as shown in FIG. 7.

Until switching manner j attains to n, the above mentioned process is repeated, and then the process proceeds to a step S6. When the process is performed until j=n, an output level for each switching manner is stored in non-volatile memory 18 as shown in FIG. 7. In step S6, the largest one of the stored output values is selected. Here, the largest output value is when switching manner j=4, 5 and 6. Among these switching manners, j=5 in the middle is selected as a suitable switching manner. It is also apparent from FIG. 6 that switching manner j=5 is preferable. Then, CPU 17 applies a suitable flag to suitable switching manner j=5 and stores it. (a step S7). As described above, step S6 corresponds to a manner determining means in the present embodiment.

Figure 8:
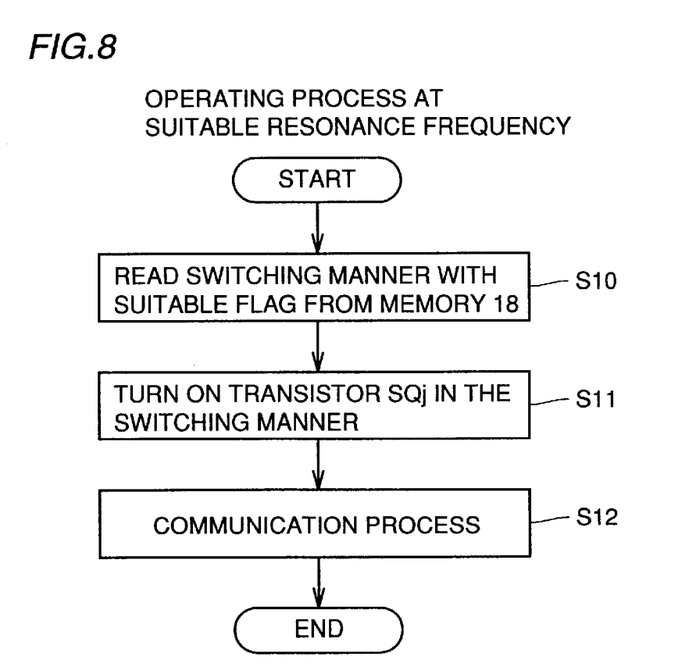
FIG. 8 is a flow chart showing a process of operation at a suitable resonance frequency.

After the suitable switching manner is determined as described above, CPU 17 then operates at the suitable resonance frequency. The flow chart for the process is shown in FIG. 8. First, switching manner j is obtained to which the suitable flag is applied from non-volatile memory 18 in a step S10. Then, transistor SQj designated by switching manner j is turned on (a step S11). Thus, power is supplied by the high-frequency carrier in the most efficient state from interrogator 50. Subsequently, a prescribed communication process is performed (a step S12). As described above, steps S10 and S11 correspond to the driving means in the present embodiment.

As described above, the resonance frequency of resonance circuit 13 is automatically adjusted such that the power supply from interrogator 50 is maximum. Therefore, deviation of the resonance frequency of resonance circuit 13 caused by variation in authorized parts or the like can readily be adjusted during manufacture. In addition, once the adjustment is made, the suitable resonance frequency is achieved simply by performing an operation shown in FIG. 8, whereby decrease in operation speed is prevented.

It is noted that every switching manner is examined in order to achieve the suitable switching manner in the present embodiment. However, examination of the subsequent switching manners may be eliminated when the output value exceeding the prescribed threshold value is obtained, and the switching manner for the output value exceeding the threshold value is determined as the suitable switching manner. Thus, automatic adjustment is rapidly performed.

Further, examination of the subsequent switching manners is eliminated when the output value exceeds the prescribed threshold value and becomes smaller than that for the preceding switching manner, and the switching manner corresponding to the maximum value at the time may be determined as the suitable switching manner. Thus, rapid and optimum switching manner is ensured.

Figure 9:
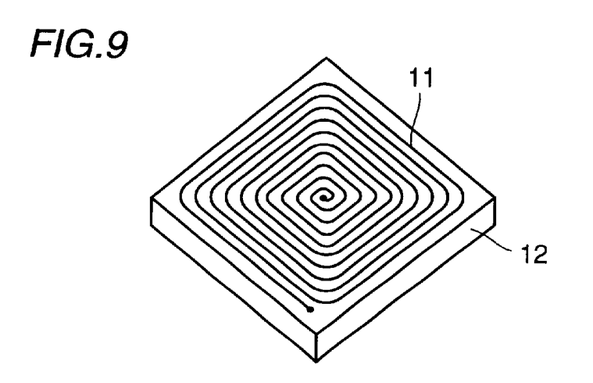
FIG. 9 is an illustration showing a modification of the non-contact IC card shown in FIGS. 2 to 8.
Figure 10:
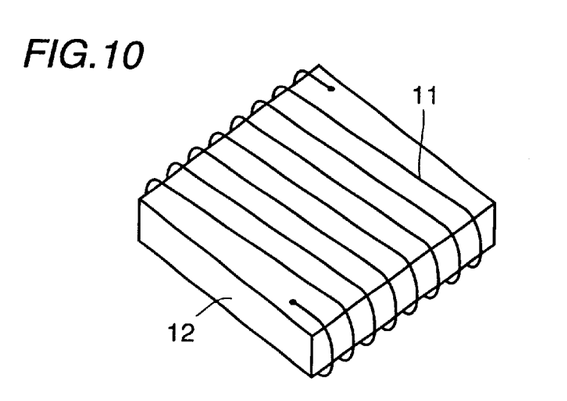
FIG. 10 is an illustration showing still another modification of the non-contact IC card shown in FIGS. 2 to 8.
Figure 12:
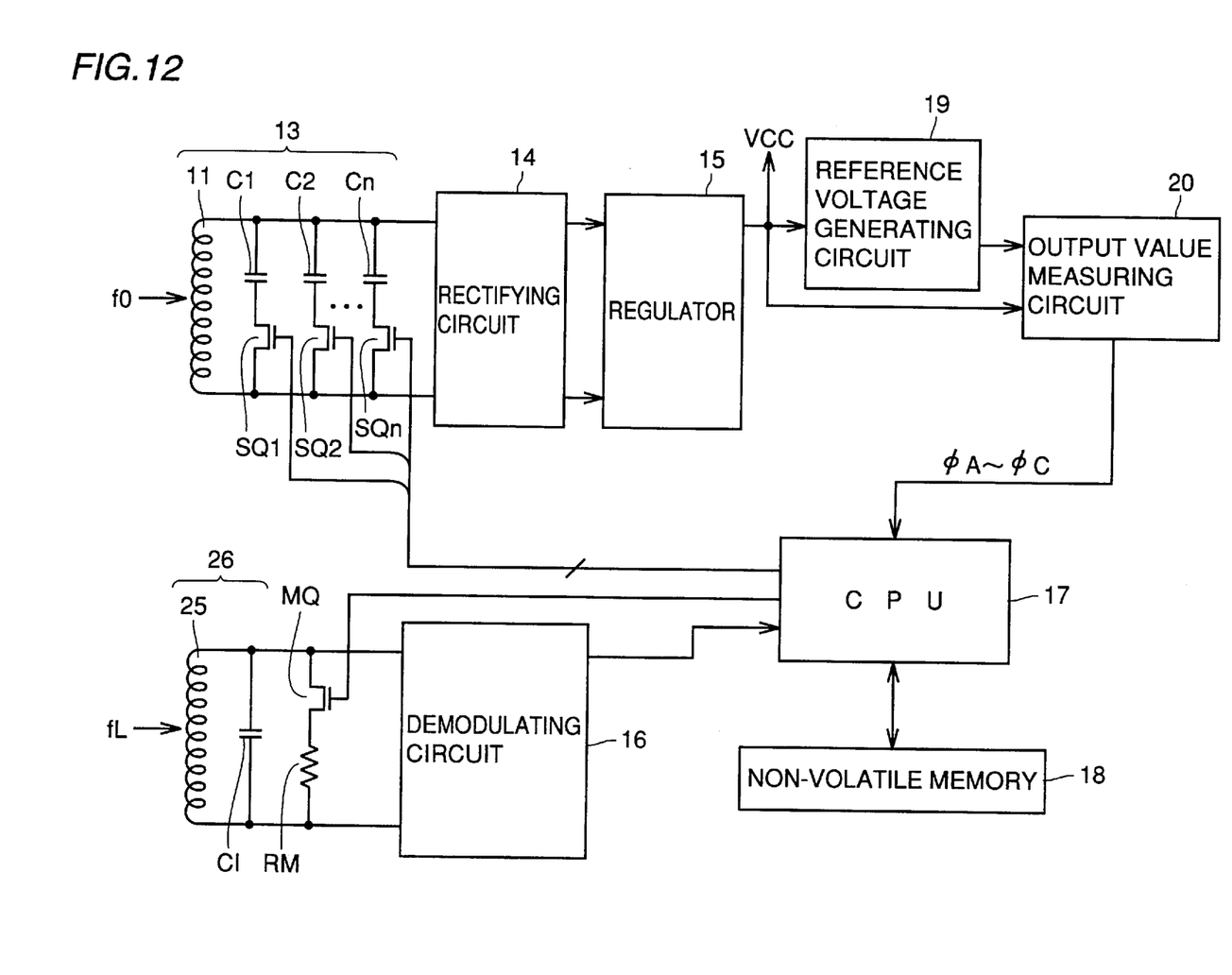
FIG. 12 is a circuit block diagram showing a structure of a non-contact IC card according to a second embodiment of the present invention.

In the present embodiment, IC chip 12 corresponds to a portion other than antenna 11 and condenser C as shown in FIG. 2. However, condenser C may be integrated with the IC chip. The number of contact terminals of the IC chip can be reduced in this way. As shown in FIG. 9, antenna 11 may be provided on an upper surface of IC chip 12 by printing. Further, as shown in FIG. 10, antenna 11 may be wound around IC chip 12. As shown in FIG. 12, antenna 11 is formed of an aluminum interconnection layer in IC chip, so that the entire portion thereof is in IC chip 23. In these cases, the size of antenna 11 cannot be increased, thereby possibly decreasing efficiency. Therefore, it is particularly preferable to enable efficient power supply using the method of automatic adjustment according to the present invention.

Second Embodiment

The non-contact IC card for performing power supply and data communication with the same carrier has been described in the first embodiment. In a second embodiment, a non-contact IC card for performing power supply and data communication with different carriers at different frequencies will be described. As shown in FIG. 12, in the IC card, power is supplied from an interrogator by an unmodulated carrier f0, and data communication with the interrogator is performed by a carrier fL.

A resonance circuit 26 for data communication includes an antenna 25 and a condenser C1. A demodulating circuit 16 demodulates data from the modulated carrier and applies it to CPU 17. For transmission of data to the interrogator, CPU 17 turns on/off a transistor for modulation MQ to connect or disconnect a resistance element RM and resonance circuit 26 when the interrogator is outputting an unmodulated carrier fL. Thus, an amplitude of carrier fL is changed by changing an impedance for the interrogator, so that data is restored in the interrogator.

Resonance circuit 13 for which power is supplied includes an antenna 11, condensers C1 to Cn and transistors SQ1 to SQn. The second embodiment is the same as the first embodiment in that CPU 17 determines a suitable switching manner for transistors SQ1 to SQn in accordance with an output VCC from a regulator 15 for storing it in nonvolatile memory 18.

Third Embodiment

Figure 13:
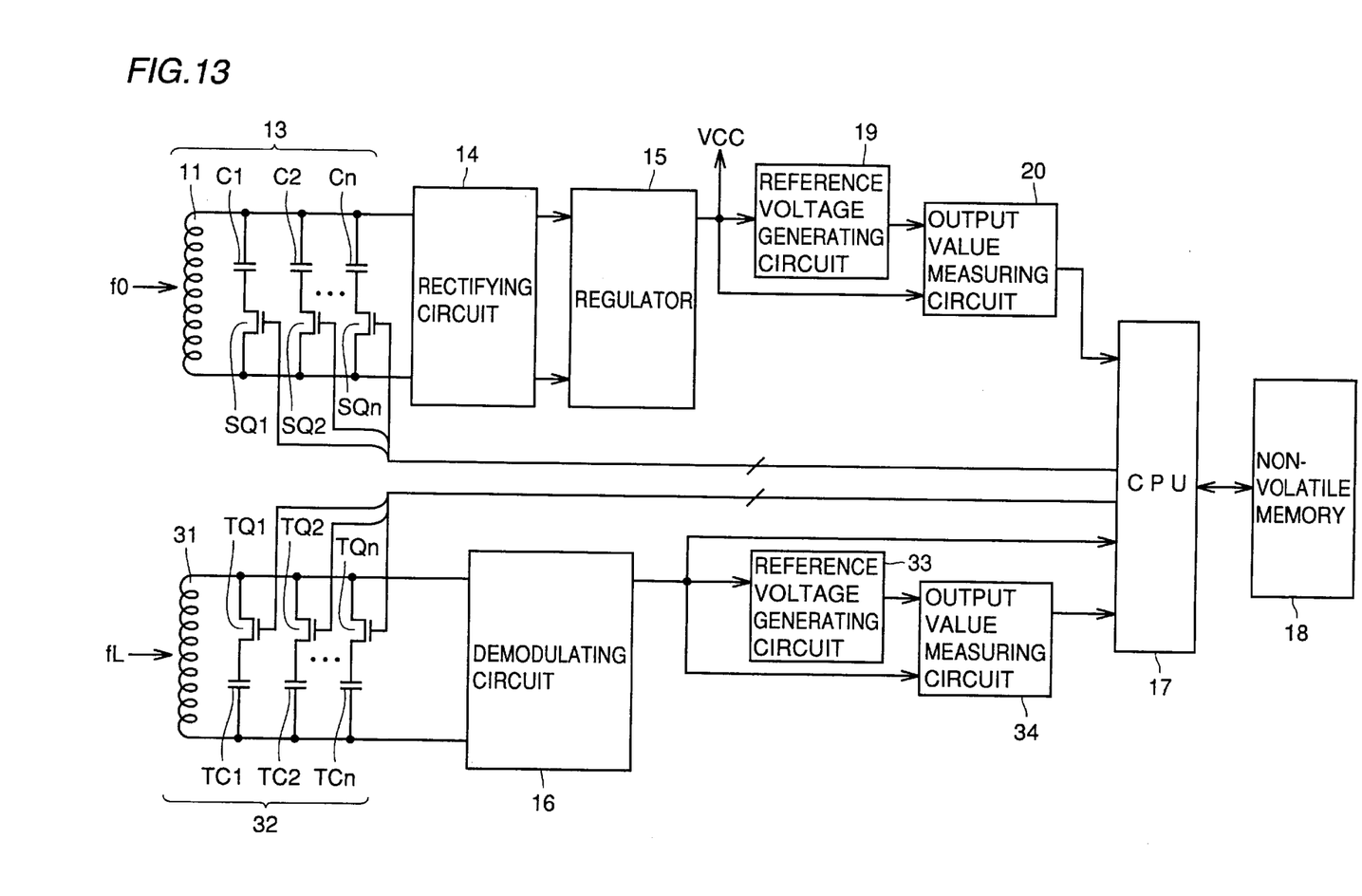
FIG. 13 is a circuit block diagram showing a structure of a non-contact IC card according to a third embodiment of the present invention.

FIG. 13 is a circuit block diagram showing a structure of a non-contact IC card according to a third embodiment of the present invention. The present embodiment is structured such that a resonance frequency is automatically adjusted not only in resonance circuit 13 for power supply but also in resonance circuit 32 for data communication. Thus, also in resonance circuit 32 for data communication, one of condensers TC1 to TCn is selected by transistors TQ1 to TQn and connected in parallel to antenna 31. In addition, an output value measuring circuit 34 determines a suitable switching manner by comparing an output from demodulating circuit 16 with a reference voltage generated in a reference voltage generating circuit 33. It is noted that the structures of reference voltage generating circuit 33 and output value measuring circuit 34 are similar to those of reference voltage generating circuit 19 and output value measuring circuit 20.

According to the present embodiment, the resonance frequency for data communication can also be automatically adjusted. Further, in the present embodiment, a modulating circuit (a circuit corresponding to transistor MQ and resistance element RM in FIG. 12) for data communication with the interrogator is not separately provided. This is because an impedance for the interrogator is changed by switching between the suitable switching manner and the other switching manner in accordance with data under control of CPU 17.

Various Modifications

In the first to third embodiments, one of condensers C1 to Cn (TC1 to TCn) is connected to antenna 11 (25, 31). However, a switching manner which allows a plurality of condensers to be simultaneously connected to an antenna may be used. In this way, a number of switching manners are ensured with a small number of condensers.

Figure 14:
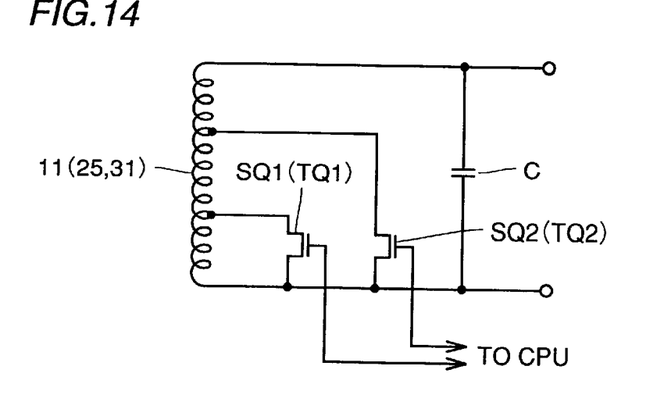
FIG. 14 is a diagram showing a modification of a resonance circuit of the non-contact IC card according to the first to third embodiments.
Figure 15:
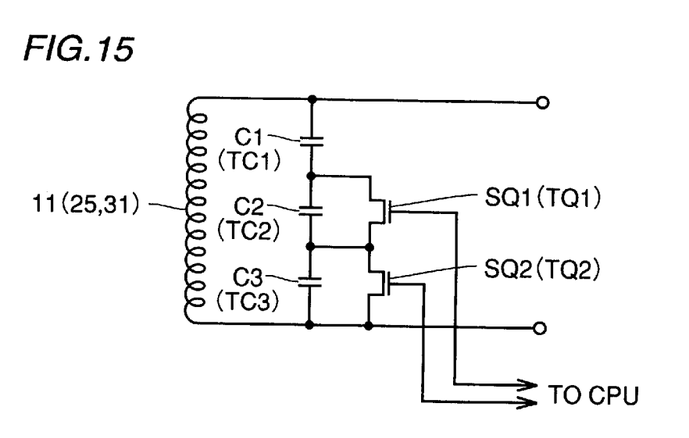
FIG. 15 is a diagram showing still another modification of the resonance circuit of the non-contact IC card according to the first to third embodiments.
Figure 16:
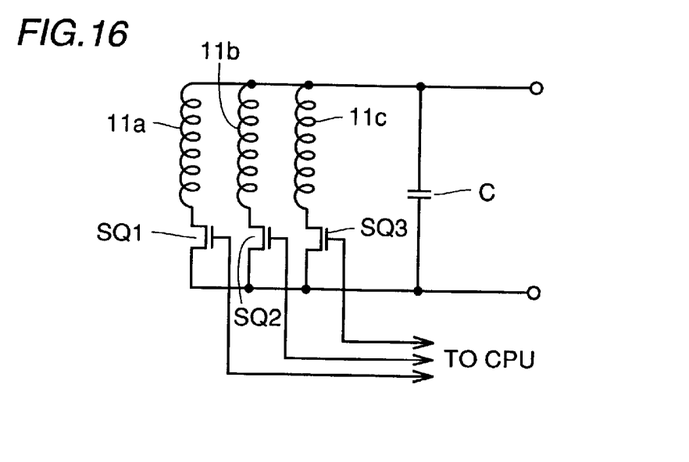
FIG. 16 is a diagram showing still another modification of the resonance circuit of the non-contact IC card according to the first to third embodiments.

Another exemplary structures of the resonance circuit allowing adjustment of a resonance frequency are shown in FIGS. 14 to 16. The resonance circuit shown in FIG. 14 switches an effective inductance of an antenna 11 (25, 31) by short-circuiting a part of antenna 11 (25, 31) by a transistor SQ1 (TQ1) or SQ2 (TQ2). A resonance circuit shown in FIG. 15 allows one, two or three of condensers C1, C2 and C3 which are connected in series to be connected in parallel to antenna 11 (25, 31) by turning on or off transistor SQ1 (TQ1) or SQ2 (TQ2). A resonance circuit shown in FIG. 16 allows one of antennas 11a, 11b and 11c to be connected in parallel to a condenser C by turning on one of transistors SQ1 to SQ3. It is noted that these circuits may arbitrarily combined to provide a resonance circuit. A structure of the resonance circuit may be determined in consideration of how easy each element is formed, the number of connecting terminals required for an IC chip or the like.

Figure 17:
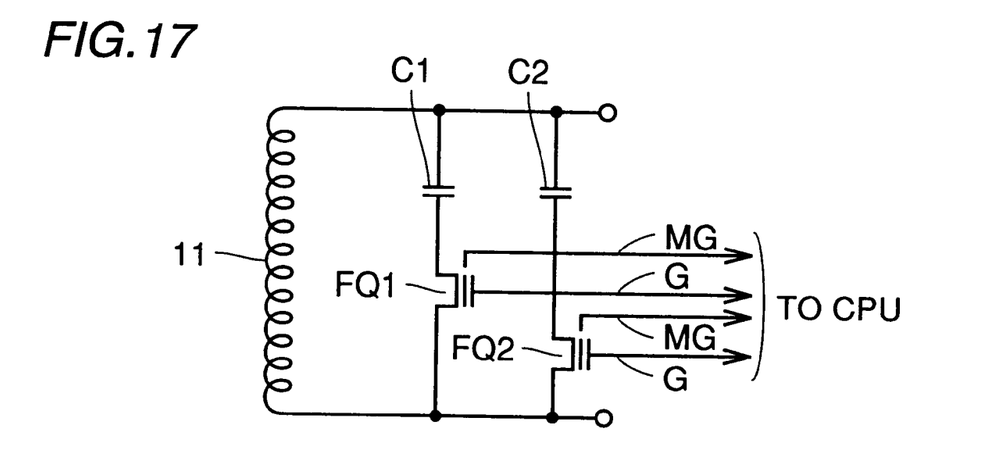
FIG. 17 is a diagram showing still another modification of the resonance circuit of the non-contact IC card according to the first to third embodiments.
Figure 18:
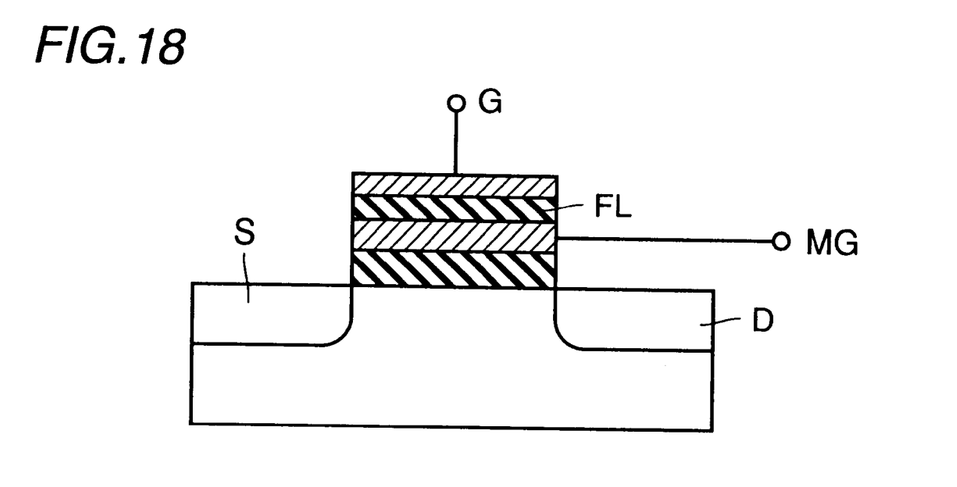
FIG. 18 is a cross sectional view showing a structure of a non-volatile memory shown in FIG. 17.

Further, in the first to third embodiments, CPU 17 reads the suitable switching manner to which the suitable flag is applied from non-volatile memory 18 and, in accordance therewith, turns on one of transistors SQ 1 to SQn when the non-contact IC card is in use. As shown in FIG. 17, however, a memory device for the suitable flag and the transistor may be shared by non-volatile memories FQ1, FQ2, . . . having a ferroelectric layer FL. FIG. 18 is a cross sectional view showing a structure of a non-volatile memory FQ. Non-volatile memory FQ can change a polarization direction of ferroelectric layer FL in accordance with a direction of a voltage applied between a gate G and a memory gate MG. In accordance with the polarization direction, a region between a source S and a drain D is turned on/off. According to the present modification, CPU 17 polarizes ferroelectric layer FL of non-volatile memory FQ to be turned on in the suitable switching manner in an on direction. As a result, non-volatile memory FQ is automatically turned on, so that a condenser is selected such that a suitable resonance frequency is ensured without performing processes of steps S10 and S11 in FIG. 8 by CPU 17 during actual use. Thus, operation speed is increased.

In the first to third embodiments, the resonance frequency is automatically adjusted during manufacture. However, the automatic adjustment may be performed once in a prescribed period of time for correcting change in the resonance frequency due to secular change or change in ambient temperature. For example, automatic adjustment may be performed when a prescribed day arrives, when a prescribed period of time is elapsed after a previous adjustment, or when the device is used for a prescribed number of times. In these cases, measurement of the day and the number of usage may be performed on the side of the interrogator or the IC card. It may also be performed by both of the interrogator and the IC card.

Further, if there is not any problem concerning the processing speed, automatic adjustment may be performed every time the non-contact IC card is used.

In the first to third embodiments, pulse amplification modulation is performed for the carrier for data communication. However, the present invention can be applied to any method of modulation such as pulse frequency modulation, pulse phase modulation, analog amplitude modulation, analog frequency modulation and analog phase modulation.

Although the present invention has been described as being applied to the non-contact IC card in the first to third embodiments, it is not limited to this and may be applied to an instrument performing a process other than communication as long as it externally receives power supply by a carrier.

Although the instrument externally receiving power supply by the carrier has been described in the first to third embodiments, automatic adjustment of the resonance frequency may also applied to the portion other than that for power supply as shown for example in FIG. 13.

Although a responder is embodied in the form of the non-contact IC card in the first to third embodiments, the configuration of the responder is not limited to a card, and the responder may assume any configuration including a box, notebook or any other configuration.

It is noted that an expression "communication through electromagnetic wave" in the present invention indicates a radio communication utilizing an electromagnetic function, and is a concept including communication through electromagnetic coupling in addition to communication utilizing a radiowave.

Moreover, the term "switching means" corresponds to a means capable of switching a connection state of a circuit and a constant, regardless of a mechanical or electrical structure. It does not only digitally switches between on and off but also successively switches a constant such as a resistance value in an analog manner. In the embodiments, transistors SQ1 to SQn in FIGS. 3 and 12 and transistors TQ1 to TQn correspond to this.

The term "transistor" is a device which controllably turns on/off by a control voltage (current) applied to a gate, base or the like.

Figure 11:
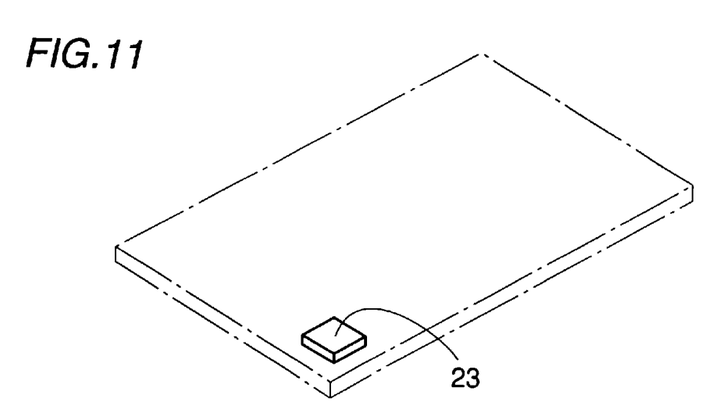
FIG. 11 is an illustration showing still another modification of the non-contact IC card shown in FIGS. 2 to 8.

The term "antenna" is an element having an inductance component necessary for receiving a desired electromagnetic wave regardless of its shape, formation method or the like In the embodiments, the antenna may be a wiring wound in a form of a coil as shown in FIGS. 2 and 10, printed on a surface of IC chip 12 as shown in FIG. 9, or formed as an aluminum interconnection layer in IC chip 23 as shown in FIG. 11.

The term "condenser" is an element having a capacitance necessary for forming a transmitting circuit with the antenna regardless of its shape, formation method or the like. In the embodiments of the present invention, condensers C1 to Cn in FIG. 3 and condensers TC1 to TCn in FIG. 13 correspond to this. In some cases, a floating capacitance of the antenna may be used as a condenser.

What is claimed is:

1. A responder for communicating with an interrogator by an electromagnetic wave in a non-contact IC card communication system comprising:

a resonance circuit (1, 13, 26, 32) including an antenna (11, 25, 31) receiving the electromagnetic wave from said interrogator and switching means (SQ, TQ) for switching a resonance frequency of the resonance circuit; and switching manner setting means (2) for setting a switching manner of said switching means (SQ, TQ), said switching manner setting means (2) including determining means (3) for sequentially switching said switching means (SQ, TQ) of said resonance circuit (1, 13, 26, 32) and detecting an output voltage or output current of said resonance circuit (1, 13, 26, 32) in each switching manner and, in accordance with a detection result, obtaining a suitable switching manner of said switching means (SQ, TQ) producing a desired output voltage or output current, said determining means (3) including reference voltage generating means (6, 19, 33) for receiving the output voltage of said resonance circuit (1, 13, 26, 32) to generate a prescribed reference voltage regardless of variation in the output voltage, output value measuring means (7, 20, 34) for measuring a magnitude of the output voltage of said resonance circuit (1, 13, 26, 32) in each switching manner by using the reference voltage generated in said reference voltage generating means (6, 19, 33) as a reference and outputting each measurement result as an output value, output value storing means (8, 18) for storing each output value output from said output value measuring means (7, 20, 34) corresponding to each switching manner of said switching means (SQ, TQ), and manner determining means (9, 17) for determining as a suitable switching manner a switching manner corresponding to a largest output value read from said output value storing means (8, 18); and switching manner storing means (4, 18) for storing the suitable switching manner obtained by said determining means (3) wherein said responder is formed to receive the electromagnetic wave from the interrogator as a power source.

2. The responder in the non-contact IC card communication system according to claim 1, wherein said resonance circuit (1, 13, 26, 32) is further provided with a variable capacitance circuit (C, SQ, TQ) connected in parallel to said antenna (11, 25, 31) and including a plurality of condensers (C) and said switching means (SQ, TQ), and a capacitance of said variable capacitance circuit (C, SQ, TQ) can be switched by said switching means (SQ, TQ).

3. The responder in the non-contact IC card communication system according to claim 1, wherein said resonance circuit (1, 13, 26, 32) further includes a condenser (C) connected in parallel to said antenna (11, 25, 31), and an inductance of said antenna (11, 25, 31) can be switched by said switching means (SQ, TQ).

4. The responder in the non-contact IC card communication system according to claim 1, wherein said switching means (SQ, TQ) includes a plurality of transistors (SQ, TQ), and said switching manner storing means (4, 18) stores a value that represents which one of said plurality of transistors (SQ, TQ) is rendered conductive.

5. The responder in the non-contact IC card communication system according to claim 1, wherein said resonance circuit (1, 13, 26, 32) is used at least for supplying operation power of said responder.

6. The responder in the non-contact IC card communication system according to claim 1, wherein said resonance circuit (1, 13, 26, 32) is used at least for data communication with said interrogator.

7. The non-contact IC card communication system according to claim 1, wherein said determining means (3) determines said suitable switching manner during manufacture of said responder.

8. The responder in the non-contact IC card communication system according to claim 1, wherein said determining means (3) determines said suitable switching manner once in a prescribed period of time.

9. The responder in the non-contact IC card communication system according to claim 8, wherein said prescribed period of time is between a previous determination time and a time when a prescribed amount of time has elapsed.

10. The responder in the non-contact IC card communication system according to claim 8, wherein said prescribed period of time is between a previous determination date and a time when said responder is used a prescribed number of times.

11. The responder in the non-contact IC card communication system according to claim 1, wherein said resonance circuit (1, 13, 26, 32) and said switching manner setting means (2) are formed as an integrated circuit chip.

12. The responder of claim 1, wherein said output value measurement means (7, 20, 34) includes:

threshold voltage generation means (R1–R4) for dividing said reference voltage to generate a plurality of threshold voltages; and a comparator circuit (22a–22c) comparing each of said plurality of threshold voltages generated by said threshold voltage generation means (R1–R4) and a voltage output from said resonance circuit (1, 13, 26, 32) in a switching manner and outputting a signal indicative of a resultant comparison as said output value.

\* \* \* \* \*